United States Patent [19]

D'Angelo

[11] Patent Number: 5,311,770

[45] Date of Patent: May 17, 1994

[54] FRICTIONLESS BEARING CHASSIS DYNAMOMETER

[75] Inventor: Severino D'Angelo, Laguna Beach, Calif.

[73] Assignee: Horiba Instruments Incorporated, Irvine, Calif.

[21] Appl. No.: 893,678

[22] Filed: Jun. 5, 1992

[51] Int. Cl.$^5$ ............................................. G01M 19/00
[52] U.S. Cl. ....................................... 73/117; 384/126
[58] Field of Search ....................... 73/117; 384/1, 126, 384/627

[56] References Cited

U.S. PATENT DOCUMENTS 4,077,255  3/1978  Murakami ............................. 73/117
5,154,076 10/1992  Wilson et al. ......................... 73/117

Primary Examiner—Jerry W. Myracle
Attorney, Agent, or Firm—Harness, Dickey & Pierce

[57] ABSTRACT

A frictionless bearing chassis dynamometer including a pair of laterally spaced-apart rolls adapted to be engaged and driven by a pair of wheels of a vehicle. A power exchange unit is disposed between the rolls and includes an input shaft fixedly coupled to each of the rolls. The input shaft is supported at its opposite ends by bearing assemblies which each include inner and outer annular bearings and an inner/outer race member disposed therebetween, which forms an outer race for the inner annular bearing and an inner race for the outer annular bearing. Independent bearing motor drive assemblies are coupled to each of the inner/outer race members by independently drivable bearing drive hubs, pulleys and drive belts. Independent bearing motor drive assemblies drive the bearing drive hubs at speeds slightly above and below the rotational speed of the input shaft, to thereby drive the inner/outer race members of each bearing assembly at speeds either slightly below or slightly above the rotational speed of the input shaft. In a preferred embodiment one of the bearing drive hubs is driven slower than the speed of the input shaft while the other bearing drive hub is driven at a speed slightly faster than the input shaft, and the speeds at which the bearing drive hubs are caused to rotate are periodically swapped such that each drive hub is alternately driven at speeds slightly above and below the rotational speed of the input shaft, to thereby cancel frictional forces normally introduced by each of the inner annular bearings.

16 Claims, 7 Drawing Sheets

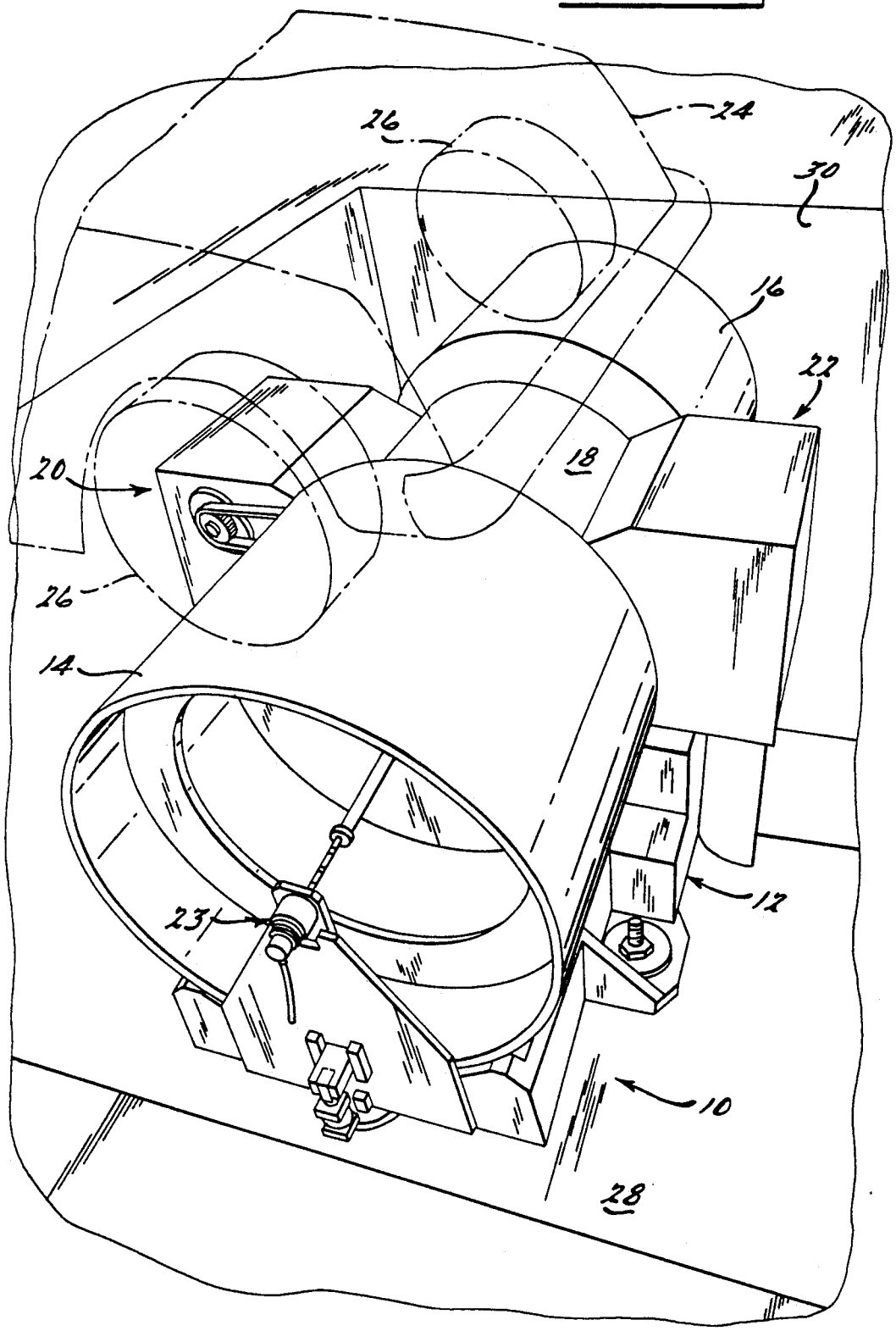

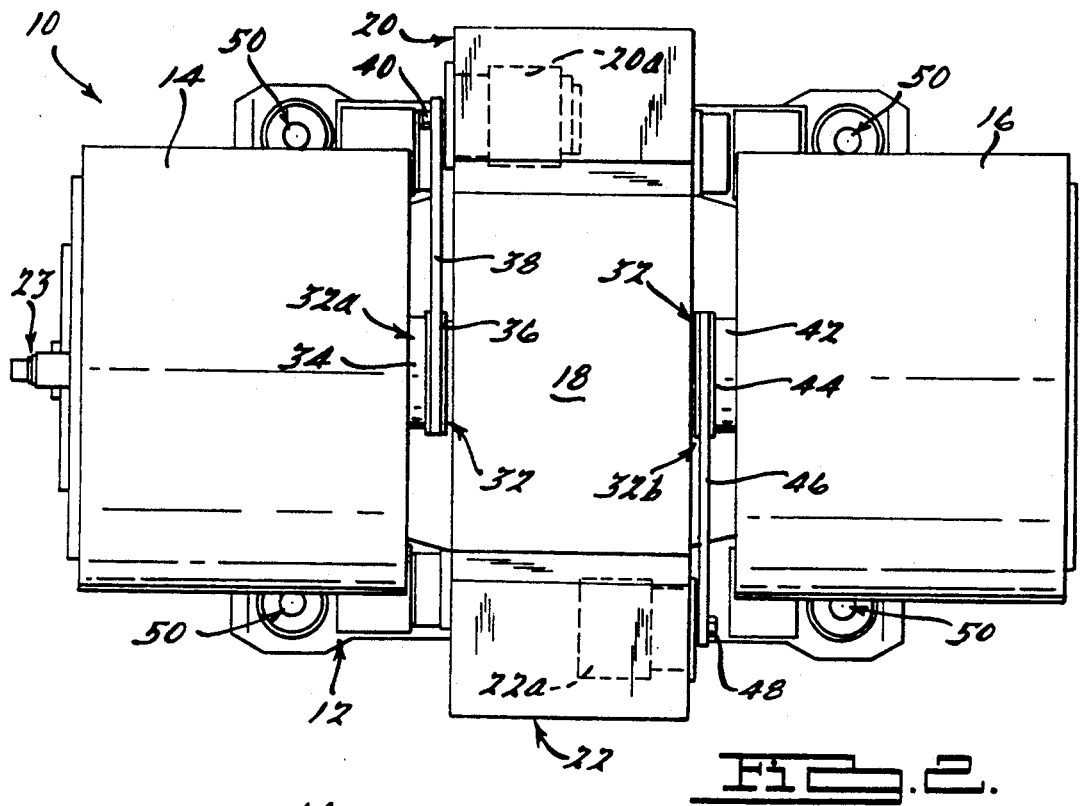
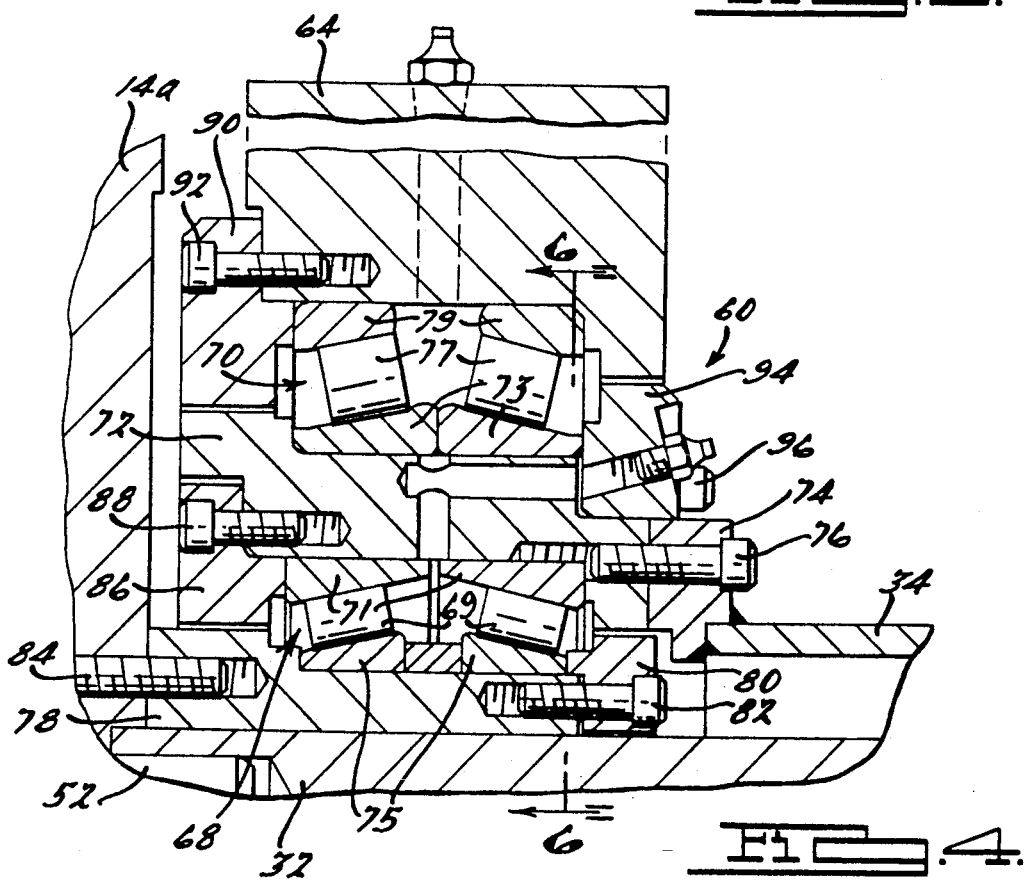

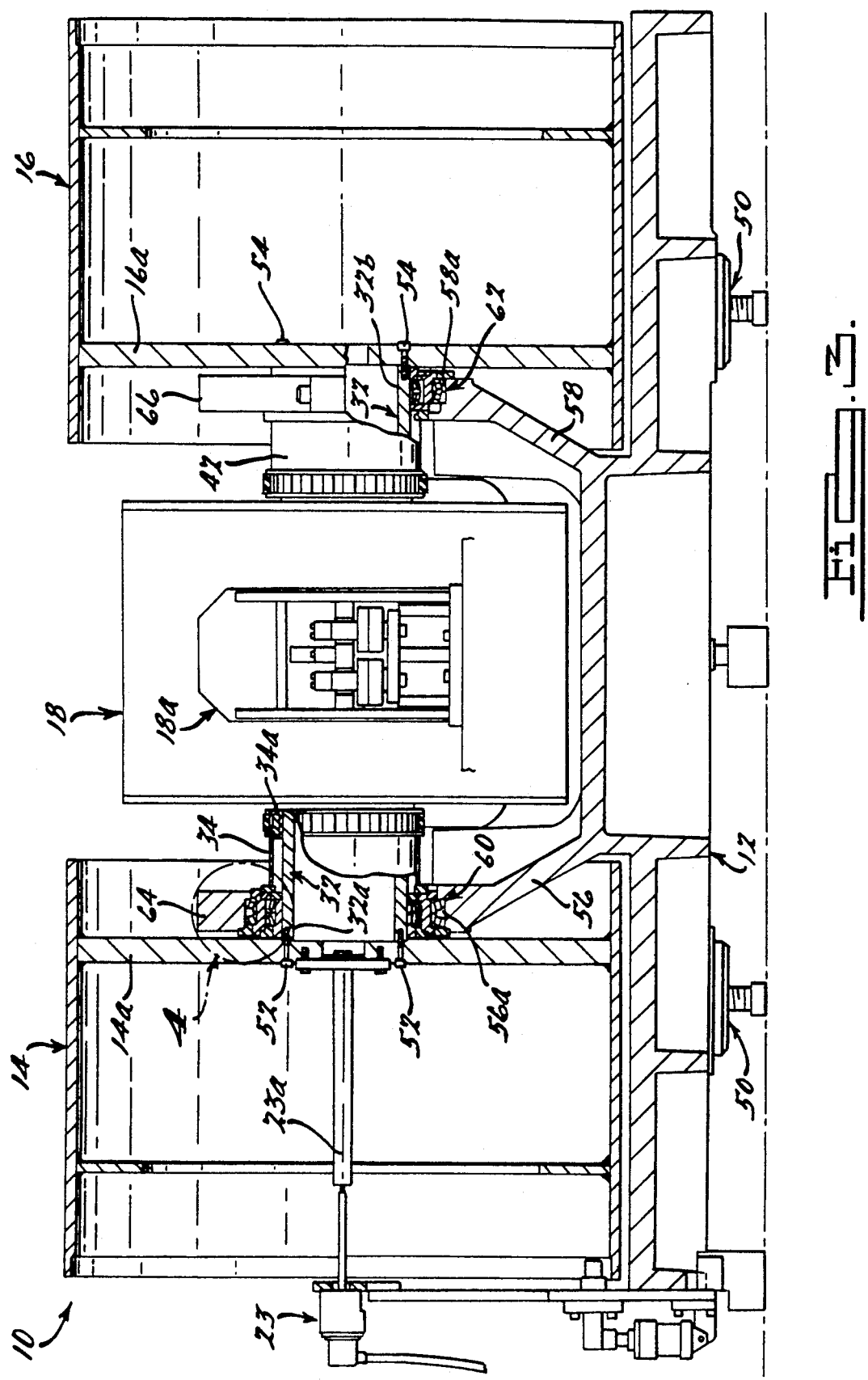

FRICTIONLESS BEARING CHASSIS DYNAMOMETER

BACKGROUND OF THE INVENTION

1. Technical Field

This invention relates to chassis dynamometers, and more particularly to a frictionless chassis dynamometer incorporating concentrically disposed inner and outer roller bearings operable to cancel or mask frictional forces introduced by the bearings during operation of the dynamometer.

2. Discussion

Chassis dynamometers are used in a wide variety of applications, and particularly in connection with the testing of motor vehicle engine emissions pursuant to Environmental Protection Agency (EPA) emissions regulations for motor vehicles. Such dynamometers typically incorporate one or more "rolls" which are driven by one or more wheels of the vehicle under test. The rolls are typically coupled to an input shaft of some form of power absorption, or exchange, device which provides a controlled degree of rolling resistance to the rolls to simulate the road load and inertia forces normally encountered during vehicle operation.

The input shaft of the power absorption device and/or the rolls is typically supported by an annular roller bearing which is interposed between the input shaft of the power exchange device and a frame portion of the dynamometer. The bearing supports the input shaft and enables rotational movement of the input shaft relative to the fixed frame portion.

To compensate for the frictional forces introduced by the bearing on the input shaft, the dynamometer typically must be run for at least about twenty to thirty minutes to "warm-up" the bearings. It is then presumed that the friction of the bearings will vary with speed in accordance with known friction versus speed characteristics. These friction characteristics are stored in an external controller memory and then mathematically subtracted out from measurement data obtained by the dynamometer by an external controller by known friction compensation algorithms. The drawback with this approach, however, is that the friction of the bearings varies not only with speed but also with the temperature of the bearings, the loading on the bearings, and the duration of operating time intervals. These factors have proven difficult to accurately compensate for with correction algorithms. Moreover, friction compensation algorithms do not allow for variations in the degree of compensation being applied during an actual vehicle simulation test, only during execution of the compensation program itself. Accordingly, unaccounted for changes in vehicle loading or ambient room temperatures that occur during a vehicle simulation test would not be compensated for by conventional friction compensation algorithms.

Temperature, in particular, can prove especially difficult to determine and compensate for. More and more applications are requiring that dynamometers be operated in a cold testing facility (CTF) to enable carbon monoxide emissions to be measured at cold temperatures in accordance with EPA regulations. Since such "cold rooms" are also frequently used at significantly higher temperatures, the temperatures of the component parts of the dynamometer, and particularly the bearings, do not "settle" or become stable quickly. This is due in large part to the mass of the various components of the dynamometer, and the fact that many components, such as the rolls and bearings, are made from metal and thus form excellent paths for the transfer of heat and cold. Thus, while the ambient room temperature may stabilize quickly, the temperatures of the component parts of the dynamometer, and particularly the bearings, will not. Accordingly, bearing friction is particularly difficult, if not impossible, to accurately estimate and account for in test data, and stable bearings cannot be obtained until their temperatures stabilize.

Prior systems have attempted to alleviate this problem by providing means for heating the bearings such as by heated oil circulation systems or by closely regulating the temperature of the test cell in which the dynamometer is located. However, these systems have proven somewhat costly and unable to provide the degree of control necessary to accurately account for rapid ambient temperature changes.

With prior designs of chassis dynamometers, the bearings supporting the rolls and/or input shaft must also be selected with precision as a foremost consideration, rather than high durability. This usually means that high cost bearings must be used that introduce a minimum amount of friction, at the expense of lower cost bearings that have high durability but which introduce a greater amount of friction. Since higher precision, lower durability bearings are typically used, bearing maintenance and failure are higher than what would otherwise be experienced with high durability bearings. Moreover, periodic friction calibrations are typically required to compensate for variations in friction of the bearings resulting from wear.

SUMMARY OF THE INVENTION

The above and other drawbacks are overcome by a frictionless bearing chassis dynamometer in accordance with preferred embodiments of the present invention. The dynamometer generally includes at least one roll which is adapted to engage the driving wheel of a vehicle. The roll is fixedly coupled to an input shaft of a power exchange means which simulates the road load and inertia forces which must be overcome by the vehicle during normal operation of the vehicle.

The input shaft is supported by concentrically disposed inner and outer bearings, with an inner race of the inner bearing supporting the input shaft and an outer race of the outer bearing being supported by a frame portion of the dynamometer. Interposed concentrically between the inner and outer bearings is an inner/outer race member which forms an outer race for the inner bearing and an inner race for the outer bearing. The inner/outer race member is further coupled to a bearing drive motor which is responsive to the changing rotational speed of the input shaft. The bearing drive motor is controlled such that it drives the inner/outer race member in the same direction of rotation as the input shaft, and preferably at a speed alternately slower and faster than the input shaft speed. By driving the inner/outer race member in such a manner the frictional forces of the inner bearing, which would normally tend to oppose rotational movement of the roll, are virtually eliminated.

In the preferred embodiment of the invention the dynamometer includes a pair of laterally spaced apart rolls which each engage and are each driven by the front or rear wheels of a vehicle. A power exchange means in the form of a well known Power Exchange Unit (PEU) is disposed between the rolls and includes an input shaft which extends and is fixedly secured at its opposite ends to each of the rolls. Each end of the input shaft includes an inner annular bearing concentrically disposed thereover and an outer annular bearing concentrically disposed over each inner annular bearing. Interposed in between each pair of inner and outer bearings is an inner/outer race member which forms an outer race for the inner bearing and an inner race for the outer bearing. Each of the inner/outer race members are operably coupled to independent bearing drive motors.

One of the bearing drive motors drives its respective inner/outer race member in the same direction of rotation as the input shaft and at a rotational speed that is slightly less than the rotational speed of the input shaft. The other bearing drive motor drives its respective inner/outer race member in the same direction and at a rotational speed that is slightly greater than the rotational speed of the input shaft. After a predetermined time interval, the inner/outer race member that was being driven at a speed slightly slower than the input shaft speed is then driven at a speed slightly faster than the input shaft, while the opposite inner/outer race member which was driven at a speed slightly faster than the input shaft is then driven at a rotational speed slightly slower than the input shaft. This operation is alternated in accordance with a predetermined time interval to substantially completely eliminate frictional forces introduced by the bearings when more than one pair of inner and outer bearings is employed.

The preferred embodiments of the invention provide several significant advantages over conventional dynamometer designs. Initially, the "warm-up" time normally otherwise needed before the bearings become stable is virtually eliminated. Thus, the dynamometer of the present invention can begin providing test data almost immediately after start-up and does not require the typical twenty to thirty minute warm-up time needed by other dynamometers.

Another advantage is that the bearings of the dynamometer can now be selected with durability as the primary consideration rather than precision. Since the degree of friction introduced by the bearings is virtually cancelled out regardless of the amount of friction, it is no longer necessary to use precision bearings which generate the least degree of friction. This also enables lower cost bearings to be implemented.

Yet another advantage of the present invention is that lubricants can be selected which are high in durability rather than lubricants designed to minimize friction at the expense of durability. Accordingly, lower cost lubricants may be purchased which provide greater durability and help lower the frequency of periodic maintenance and/or calibration of the bearings.

The dynamometer of the present invention also provides numerous operational benefits over presently existing bearing configurations. Bearing friction loss remains virtually zero over variable operating temperatures, varying loads, and varying operating time intervals. The bearings are stable almost immediately upon start-up of the dynamometer and remain stable regardless of changes in ambient room temperature or loads placed upon the dynamometer. The embodiments of the present invention are particularly well suited for use in cold testing facilities where frequent changes in ambient temperature of the room can significantly affect the stability of the bearings, and where compensating for such temperature variations is often difficult, if not impossible.

The overall reliability of the dynamometer of the present invention is increased because of the virtually eliminated bearing friction, which would normally tend to hasten wear of the bearings. Additionally, by incorporating two bearings, one concentrically disposed within the other, the dynamometer will still be operational if one of the bearings seizes up during operation. For example, if the inner bearing seizes, the input shaft of the power exchange means would still be able to rotate upon the outer bearing.

BRIEF DESCRIPTION OF THE DRAWINGS

The various advantages of the present invention will become more apparent to one skilled in the art by reading the following specification and subjoined claims, and by referencing the following drawings in which:

FIG. 1 is a perspective view of a frictionless roll chassis dynamometer in accordance with the preferred embodiment of the present invention, also showing in phantom the rear wheels of a vehicle such as an automobile in contact with the rolls of the dynamometer;

FIG. 2 is a plan view of the dynamometer of FIG. 1;

FIG. 3 is a cross sectional view of the dynamometer of FIG. 2 in accordance with section line 3—3 of FIG. 2;

FIG. 4 is an enlarged, fragmentary, cross sectional view of a portion of the inner and outer bearings and inner/outer race member in accordance with the circled area of FIG. 3;

FIG. 9 is a flowchart of the sequence of operation of the dynamometer; and

DETAILED DESCRIPTION OF THE PREFERRED EMBODIMENTS

Figure 5:
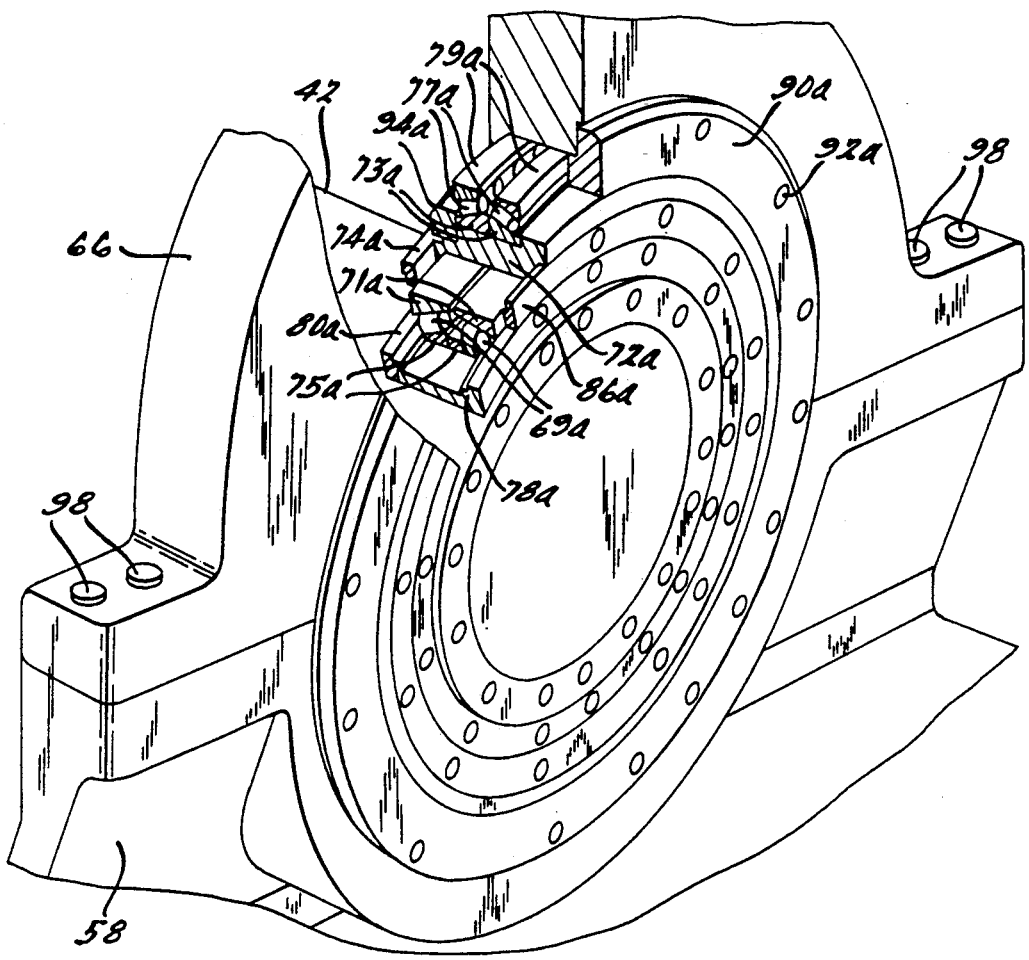
FIG. 5 is a fragmentary, perspective, partial cross sectional illustration of the inner and outer bearings and the inner/outer race member of the second bearing assembly.

Referring to FIG. 1, a roll chassis dynamometer 10 incorporating frictionless bearings in accordance with a preferred embodiment of the present invention is illustrated. Dynamometer 10 generally includes a frame 12, first and second coaxially aligned and laterally spaced apart 48 inch diameter rolls 14 and 16; a power exchange means in the form of a power exchange unit (PEU) 18 disposed in between the rolls 14 and 16 and coaxially aligned with the longitudinal axes of rotation of the rolls 14 and 16; and first and second bearing drive motor assemblies 20 and 22, respectively. A conventional, electro-optical encoder assembly 23 is operationally coupled to the PEU 18. A rear end of a vehicle 24 is illustrated in phantom showing how wheels 26 of the vehicle 24 engage outer surfaces of the rolls 14,16 to drive the rolls 14,16. The dynamometer 10 is typically secured to the floor 28 of a pit 30, although it could be mounted at ground level provided appropriate structure in the form of ramps or the like are provided for driving the vehicle up to a position wherein wheels 26 can engage the rolls 14,16.

With reference to FIG. 2, the PEU 18 can be seen to include an input shaft 32 having a first end 32a and an opposite, or second, end 32b. In the preferred embodiment the PEU 18 includes a conventional load cell 18a and comprises an AC induction motor employing flux vector power conversion technology, and is commercially available from Reliance de Mexico, SA (REMSA) of Mexico City, Mexico. This form of PEU has been found to provide faster response time, better zero-speed control, and generally lower maintenance than PEU's employing conventional DC technology. In addition, placement of the PEU 18 between the rolls 14,16, rather than outside of the rolls 14,16, provides for a more compact arrangement than most previously designed dynamometers. The load cell 18a of the PEU 18 enables varying loads to be simulated as the wheels 26 drive the rolls 14,16. The load cell 18a also enables various performance parameters such as the torque exerted on the rolls 14,16 (i.e., the "roll torque") to be measured.

A first bearing drive hub 34 is disposed concentrically over end 32a of input shaft 32 and rotationally supported thereon by a bearing 34a. The bearing drive hub 34 is coupled via a pulley 36 and a belt 38 with a pulley 40. The pulley 40 is in turn coupled to a motor 20a of the first bearing motor drive assembly 20. Similarly, the second end 32b of input shaft 32 is circumscribed by a second bearing drive hub 42, which is likewise rotationally supported by a bearing (not shown). The second bearing drive hub 42 is in turn coupled to a pulley 44 in contact with a drive belt 46. The drive belt 46 is engaged with a pulley 48 which is driven by a motor 22a of the second bearing motor drive assembly 22. The entire dynamometer 10 is secured to the floor 28 of the pit 30 by a plurality of conventional alignment/fixture assemblies extending through portions of the frame 12.

The bearing drive motor assemblies 20,22 each include their own motor speed controller which is commercially available from Baldor Sweo Drive Co. of Redmond, Wash. (city state). Also, while the bearing drive motors 20a,22a have been illustrated as being coupled via conventional pulleys and drive belts to the bearing drive hubs 34,42, it will be appreciated that this coupling could be effected in numerous ways. For example, conventional sprockets and chains could be employed. Alternatively, the drive motors 20 and 22 could have their output shafts coupled directly to the bearing drive hubs 34,42, provided suitable motors are employed which can be disposed concentrically with the input shaft 32.

Referring to FIG. 3, the coupling of the rolls 14,16 to the input shaft 32 and the bearings of the present invention can be seen more clearly. Rolls 14 and 16, together, provide a base mechanical inertia of preferably about 3,000 lbs., and include members 14a and 16a, respectively. Member 14a is fixedly secured via threaded bolts 52 to the first end 32a of the input shaft 32. Member 16a is similarly secured to the second end 32b of input shaft 32 via bolts 54. An encoder shaft 23a of encoder assembly 23 is further fixedly secured to the first end 32a of the input shaft 32.

The input shaft 32 is supported upon frame portions 56 and 58 of the frame 12, and by first and second bearing assemblies 60 and 62, respectively, of the present invention. The bearing assemblies 60,62 rest upon inner surfaces 56a and 58a of the frame portions 56 and 58, respectively, and are secured thereto by pillow blocks 64 and 66, respectively. Accordingly, the rolls 14 and 16 are operable to drive the input shaft 32 about a common, longitudinally extending axis, and are supported elevationally above the frame 12 by bearing assemblies 60 and 62 in cooperation with frame portions 56 and 58.

With reference to FIG. 4, bearing assembly 60 is shown in greater detail. The bearing assembly 60 includes an inner annular roller bearing 68 disposed concentrically about the first end 32a of the input shaft 32, an annular outer roller bearing 70 disposed concentrically with the inner bearing 68 and laterally aligned with the inner bearing 68 on input shaft 32, and an inner/outer annular race member 72. The inner/outer race member 72 forms an outer race for the inner bearing 68 and an inner race for the outer bearing 70, and is disposed between the inner and outer bearings 68 and 70, respectively, and laterally aligned on the input shaft 32 with the bearings 68 and 70. The inner/outer race member 72 is in contact with an outer bearing cage 71 of the inner bearing 68 and an inner bearing cage 73 of the outer bearing 70. The outer bearing cage 71 rides upon a plurality of pairs of independent bearing rolls 69, which in turn ride upon an inner cage 75. The outer bearing 70 includes a plurality of pairs of independent bearing rolls 77 which are secured within an inner bearing cage 73 and an outer bearing cage 79. The inner/outer race member 72 is secured to a flange portion 74 via a threaded screw 76, with the flange portion 74 further being secured such as by welding to the bearing drive hub 34. Accordingly, as the bearing drive hub 34 is driven by its associated motor drive assembly 20 at a controllably variable speed, the inner/outer race member 72 is driven with it at the same speed.

Keeping the inner bearing 68 laterally aligned on the input shaft 32 is a fixed bearing ring 78 and a small bearing retainer 80, which are secured together via a threaded screw 82 and also to the frame member 14a via a threaded screw 84. A small bearing clamp ring 86 secured to the inner/outer race member 72 via a threaded screw 88 further helps to maintain the inner bearing 68 laterally fixed on the input shaft 32.

Helping to retain the outer bearing 70 in alignment with the inner bearing 68 is a large bearing clamp ring 90 secured to the pillow block 64 via a threaded screw 92. A large retainer ring 94 secured to the inner/outer race member 72 via a threaded screw 96 further helps to maintain the outer bearing 70 in lateral alignment with the inner bearing 68.

With brief reference to FIG. 5, it can be seen that the pillow block 66 associated with second bearing assembly 62 is secured to frame portion 58 via a plurality of screws 98. Pillow block 64 is secured in identical fashion to its associated frame portion 56. Accordingly, the pillow blocks 64 and 66 serve to maintain the inner and outer bearings of each bearing assembly 60 and 62 in lateral alignment with each other as well as laterally aligned with, and secured to, the input shaft 32. The second bearing assembly 62 is identical in construction to the first bearing assembly 60 and has corresponding components labeled with corresponding reference numerals which include the suffix "a".

With further reference to FIGS. 4 and 5, it is a principal feature of the present invention that the inner/outer race members 72,72a enable the outer bearing cages 71,71a to be rotated, or spun, in the same direction of rotation as the inner bearing cages 75,75a, and thus the input shaft 32. This serves to cancel the frictional forces that would otherwise be introduced by the inner bearings 68,68a when the input shaft 32, and thus the inner bearing cages 75,75a are driven by rolls 14,16. By causing the bearing drive hubs 34,36, and thus the inner/outer race members 72,72a to rotate the outer bearing cages 71,71a in the same direction at speeds close to the speed of rotation of the input shaft 32, the frictional rolling resistance of the bearing rolls 69,69a is virtually eliminated. Thus, during operation, the inner and outer bearing cages 75,75a and 71,71a rotate at close to the same speed, and in the same direction, thus causing the bearing rolls 69,69a to move (i.e. rotate) only very slowly relative to their associated inner and outer bearing cages 75,75a and 71,71a.

Since the energy required to overcome the counteracting frictional force of a bearing can be defined as the movement of the bearing multiplied by the frictional counteracting force of the bearing, reducing the movement of the bearing, that is, the movement of the bearing rolls 69,69a, to virtually zero results in a corresponding energy loss of virtually zero. Accordingly, by virtually eliminating movement of the bearing rolls 69,69a, relative to the bearing cages 71,71a and 75,75a, the parasitic energy loss normally caused by the bearings 68,68a is virtually eliminated. The rotational driving of the inner/outer race members 72,72a thus, in effect, operates to "inject" the required energy into the inner bearings 68,68a to overcome the parasitic frictional losses normally caused by these bearings 68,68a.

Figure 6:
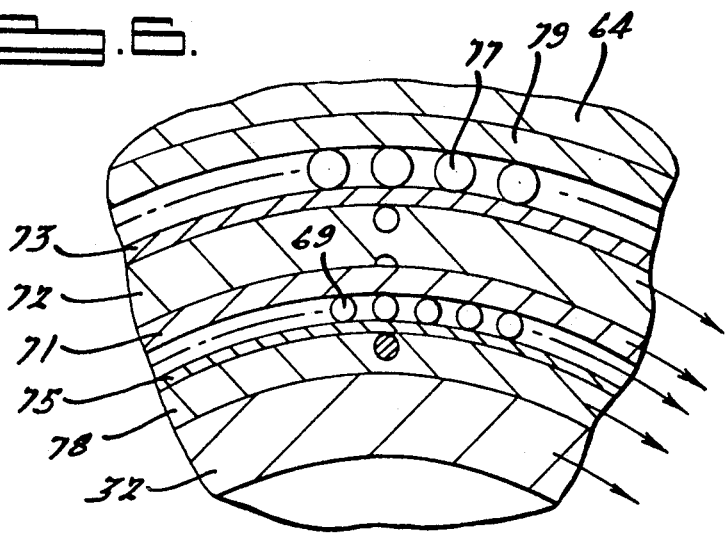
FIG. 6 is an enlarged, fragmentary, cross-sectional view of the inner and outer bearings and inner/outer race member in accordance with section line 6—6 of FIG. 4.

The above described movement is shown particularly clearly in FIG. 6. If the input shaft 32 is driven in a clockwise direction, driving the inner/outer race member 72 in the same direction at close to the speed of rotation of the input shaft 32 will cause the bearing rolls 69 to move with the input shaft 32 at almost the same speed as the input shaft 32. Accordingly, there will be very little movement of the bearing rolls 69 relative to the input shaft 32, and the entire inner bearing 68 will rotate with the input shaft 32 at almost the same speed as the input shaft 32.

Accordingly, the precision of the inner bearing 68 and the friction it normally otherwise introduces, which friction would normally oppose the rotational movement of the input shaft 32, is no longer a significant factor to be compensated for. As such, low cost, high durability bearings can thus be used for both the inner bearings 68,68a and the outer bearings 70,70a, as well as broad temperature range, high durability lubricants to ensure long bearing life, maximum reliability, and minimal maintenance of both of the bearings 68 and 70. The use of broad temperature lubricants, such as synthetic Mobil TM Grease 28, which has virtually no vapor release, virtually eliminates measurable hydrocarbon emissions to the test cell where the dynamometer 10 is located.

The utility of the dynamometer 10 is also enhanced significantly because the warm-up time of the bearings 68,68a is virtually eliminated. The dynamometer 10 of the present invention requires virtually no warm-up time to temperature stabilize the bearings, as do prior designs of dynamometers. Since frictional losses are virtually eliminated, the bearing assemblies 60 and 62 of the dynamometer 10 are essentially stable virtually upon power up of the dynamometer 10.

Moreover, drastic ambient temperature changes within the testing facility in which the dynamometer 10 is mounted, which would otherwise cause significant changes in friction which would have to be taken into account in measurements, are virtually completely eliminated by the bearing assemblies 60 and 62. Thus, the dynamometer 10 is particularly well suited for use in cold testing facilities where ambient temperatures are usually relatively low, for example, around 30 degrees fahrenheit, but occasionally raised to around 70–80 degrees fahrenheit.

Figure 7:
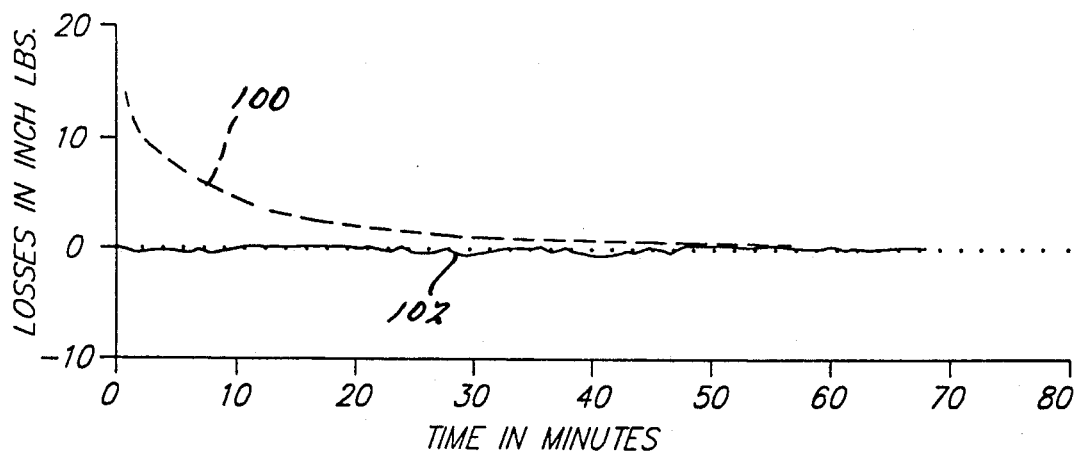
FIG. 7 is a graph of the typical torque loss as a result of bearing friction suffered by prior art dynamometers during warm-up, and the torque loss suffered by the dynamometer of the present invention during warm-up, illustrating the virtual elimination of warm-up time required for the bearings of the dynamometer of the present invention.

The reduction in warm-up time of the dynamometer 10 is illustrated graphically in FIG. 7 by curves 100 and 102. Curve 100 represents the typical torque losses caused by bearing friction introduced by prior designs of dynamometers while the bearings are warming up after start-up. Curve 102 represents the torque losses caused by friction of the dynamometer 10 of the present invention after start-up. Usually, prior art dynamometers must be run for at least 20 to 30 minutes before the bearings become relatively stable, as indicated by curve 100. However, the dynamometer 10 of the present invention requires no such warm-up time. The bearing assemblies 60 and 62 are virtually stable almost immediately upon start-up.

Another significant advantage of the dynamometer 10 of the present invention is its ability to compensate for various loads upon, and significant changes in speed of, the rolls 14 and 16, without the need to factor in predetermined corrections for these variables, as required by prior designs of dynamometers. Since the speed of the bearing rolls 69,69a are adjusted to "track" the speed of the rolls 14,16, regardless of the load imposed on the rolls 14,16, the bearing assemblies 60 and 62, in effect, automatically compensate for changing bearing loads and speed changes which would otherwise change the frictional forces introduced by bearing systems of prior designs of dynamometers. It will be appreciated, however, that conventional compensation algorithms are preferably still incorporated to account for windage resistance to movement of the rolls 14,16 and other losses not caused by friction, and also any residual friction of the bearings 68,68a.

Figure 8:
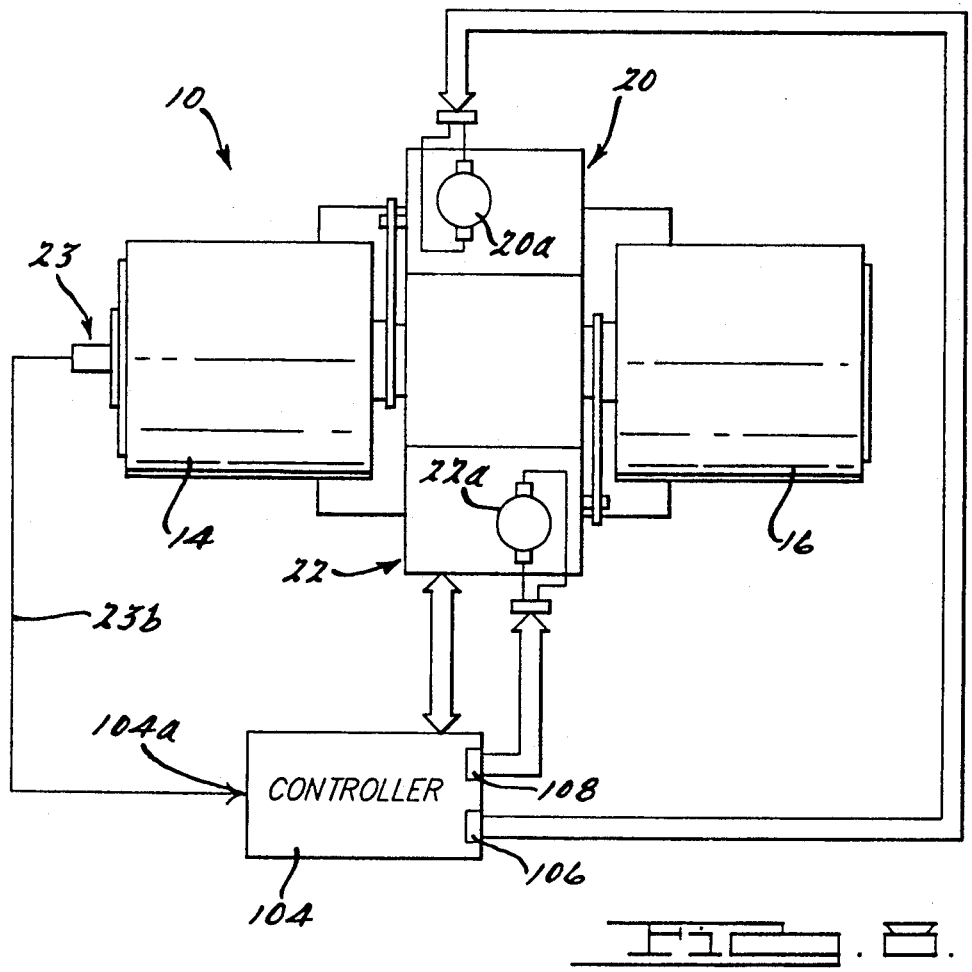
FIG. 8 is a simplified diagram of the dynamometer of the present invention as it is typically coupled to an external controller, showing the "closed-loop" speed control system which is formed thereby.
Figure 8:
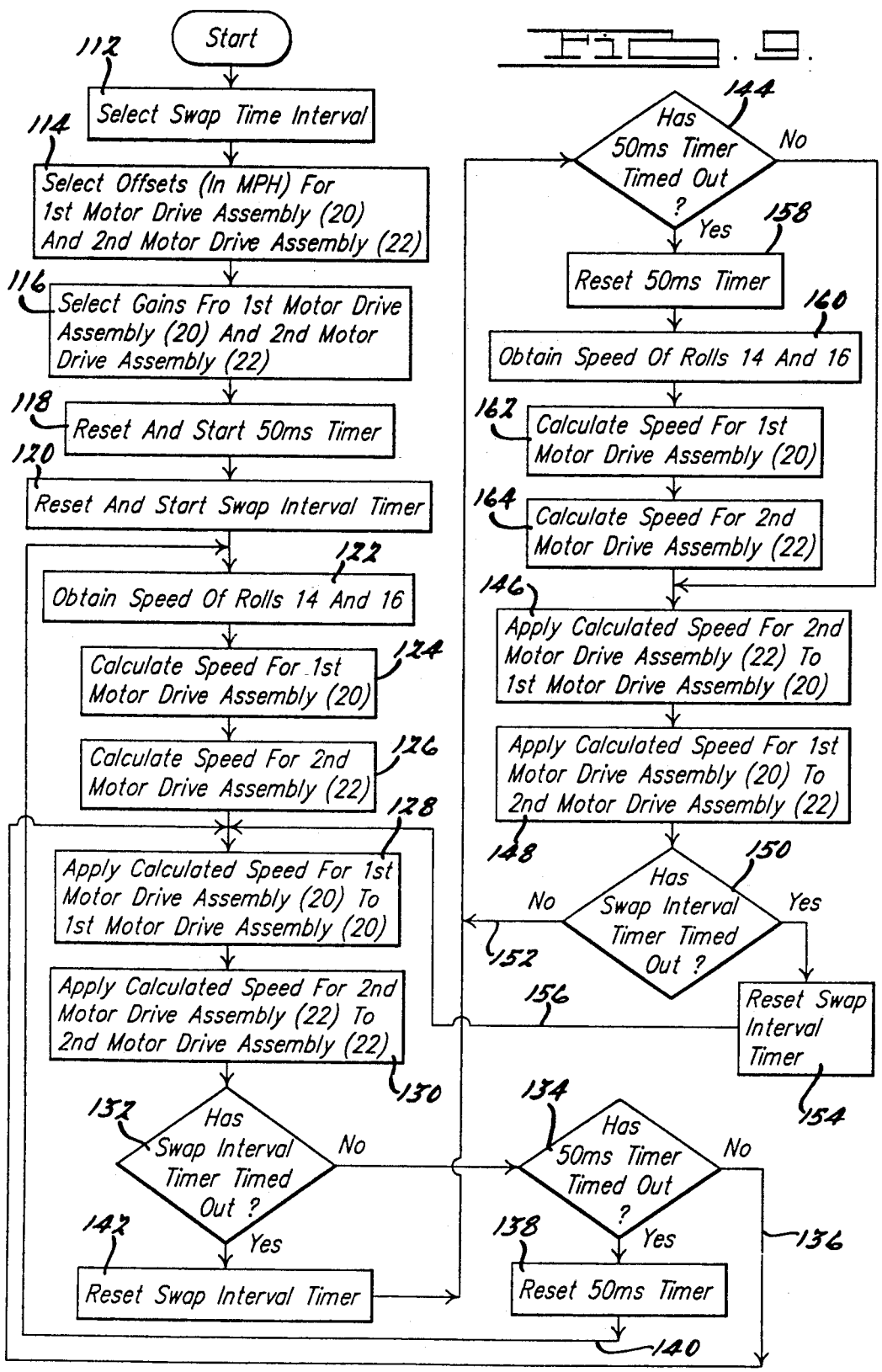

Referring now to FIG. 8, there is shown a simplified electro-mechanical schematic representation of the dynamometer 10 coupled to an associated controller system 104. The encoder assembly 23 includes a quartz crystal oscillator and provides a digital speed signal in the form of a serial bit stream which indicates the speed of the rolls 14,16, and thus the input shaft 32, within a range of about 0.01% of the true speed of the rolls 14,16. The encoder assembly 23 has its output coupled to an input 104a of the controller 104. The controller 104, which in a preferred embodiment comprises an 80386 microprocessor based computer system, monitors the speed of the rolls 14,16 by monitoring the frequency of the square wave like serial data stream generated by the encoder assembly 23 and supplied via line 23b. The controller 104 then calculates a speed value and provides a corresponding output speed signal in the form of a digital serial bit stream to each of the bearing motor drive assemblies 20 and 22 via independent, RS-232 interfaces 106 and 108. Accordingly, independent drive signals in accordance with the speed of the input shaft 32 may be provided to each of the bearing motor drive assemblies 20 and 22 and controllably varied in accordance with the changing frequency of the encoder assembly 23 output signal. This enables each of the bearing motor drive assemblies 20 and 22 to drive their associated inner/outer race members 72a and 72b at variable, predetermined speeds in accordance with the changing speed of the rolls 14,16, and thus the input shaft 32.

Since the speed of the input shaft 32 is constantly and simultaneously being monitored by the controller 104, a real-time, digital speed control system is formed. This enables changes in the speed of the rolls 14,16 to be taken into account virtually instantaneously, and appropriate adjustments made to the calculated speed signals to cause the bearing motor drive assemblies 20,22 to drive the bearing drive hubs 34,42 at speeds in close accordance with that of the input shaft 32.

With brief reference to FIG. 3, in the preferred embodiment of the present invention the inner/outer race member 72,72a of each of the bearing assemblies 60 and 62 is driven alternately at speeds slightly slower and faster than the speed of the rolls 14 and 16, and thus the input shaft 32. For example, while the first bearing motor drive assembly 20 is driving the inner/outer race member 72 of bearing assembly 60 at a speed slightly slower than the rotational speed of the input shaft 32, the second inner/outer race member 72a of bearing assembly 62 is driven by the second bearing motor drive assembly 22 at a speed slightly greater than the speed of the input shaft 32. After a predetermined time interval the speeds at which each of the inner/outer race members 72,72a are driven is "swapped", and the first inner/outer race member 72 is driven at a speed slightly faster than the input shaft 32, while the second inner/outer race member 72a is driven at a speed slightly slower than the input shaft 32. The speeds of each of the inner/outer race members 72,72a are further continuously varied in accordance with the changing speed of the input shaft 32 as indicated by encoder assembly 23. This alternate "swapping" of speeds for the two inner/outer race members 72,72a has been found to more precisely compensate for the frictional forces of the bearing assemblies 60,62, by maintaining a more uniform temperature between the two bearings 68,68a and insuring that the bearings 68,68a wear evenly.

Figure 10:
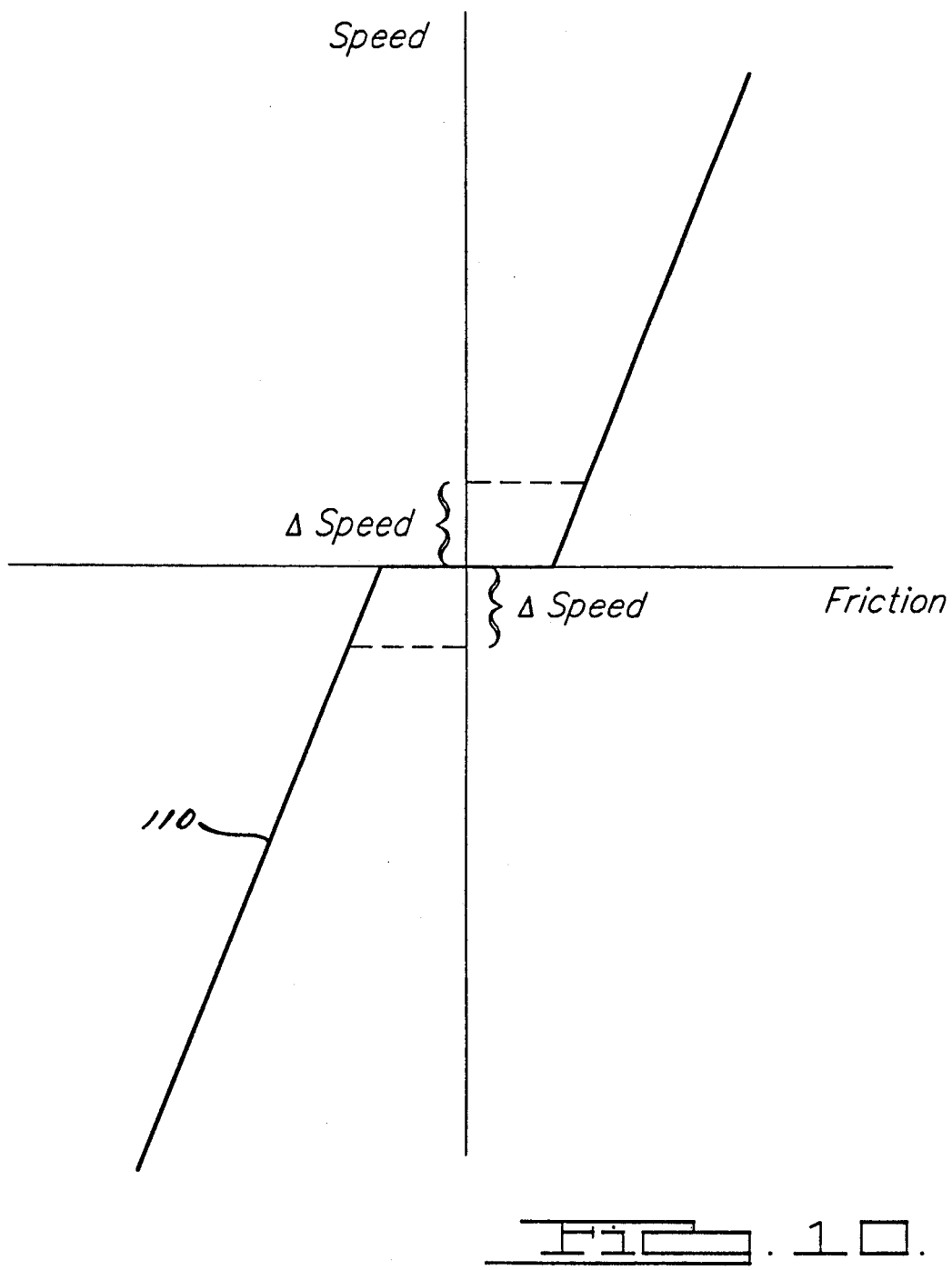
FIG. 10 is a friction vs. speed graph of the "stiction" friction of a bearing that exists around zero speed, which must be overcome to start the bearing moving in either direction.

In practice it is preferrable to purposefully drive the inner/outer race members 72,72a at speeds offset by a small predetermined amount from the speed of the input shaft 32 to avoid the ambiguity region that exists around zero speed. In particular, as shown by curve 110 in FIG. 10, the characteristic friction vs. speed curve of a bearing includes an ambiguity region around zero speed due to the "stiction" forces which must be overcome to start a bearing moving in either direction. Consequently, since it is impossible to precisely control the speed of the bearings at all times, a control scheme that attempts to match the bearing speed to the ever-changing speed of the input shaft 32 may result in small uncompensated frictional forces from the bearings being introduced into the system. Moreover, it is likely that these frictional forces from the bearings will be cumulative in effect and thus compound the quantity of the error introduced.

Accordingly, it is desirable to drive each bearing 68,68a at a speed that is purposefully offset from the speed of the input shaft 32 by a predetermined amount which places the bearing speed outside the ambiguity region that exists around zero. In addition, by driving one bearing slightly slower and the other slightly faster than the speed of the input shaft 32 by the same amount, the frictional forces introduced by the two bearings 68,68a are cancelled out. In other words, the positive amount of friction that is introduced by the bearing that is driven slightly faster is cancelled out by the corresponding amount of negative friction that is introduced by the bearing that is driven slightly slower.

The above described swapping technique is illustrated in greater detail in the flowchart of FIG. 9. Initially, a "swap time interval" is selected, as indicated at step 112. The swap time interval may vary widely but is preferably within the range of about one to three seconds, and more preferably about one second. Next, offsets in miles per hour (mph) are selected for the first bearing motor drive assembly 20 and the second bearing motor drive assembly 22, as indicated at 114. The offsets define the speed difference in miles per hour at which the first and second bearing motor drive assemblies of 20 and 22 are to be driven relative to the speed of the input shaft 32. The offsets may also range significantly in value but are preferably within the range of about one to three mph, and more preferably about two mph. Next, the gains for the first and second bearing motor drive assemblies 20 and 22 are selected, as indicated at step 116. The gains each represent a constant dependent upon design factors of each of the motors 20a and 22a, as well as the load considerations which must be simulated by the dynamometer 10.

When the dynamometer 10 is started, a timer having a maximum duration of preferably about fifty milliseconds (ms), which may be located in either the controller 104 (FIG. 8) or in software, is reset and started, as indicated at step 118. Subsequently, a "swap interval" timer is reset and started to provide a timer to continuously monitor the swap time interval indicated at step 120.

The speed of the rolls 14,16 is then obtained from controller 104 (FIG. 8), as shown at step 122, and the speed signals for the first and second bearing motor drive assemblies 20 and 22 are calculated, as indicated as steps 124 and 126, respectively. The speed signals calculated at steps 124 and 126 take into account the offsets input in step 114 and the gains selected in step 116, and operate to drive the bearing drive hubs 34 and 42 (FIG. 2) at speeds which differ from the speed of the rolls 14 and 16 by the value of the selected offsets, which as stated are preferably about two mph.

The calculated speed signal for the first bearing motor drive assembly 20 is then applied to the first bearing motor drive assembly 20, as indicated at step 128. The speed signal calculated for the second bearing motor drive assembly 22 is then applied to the second bearing motor drive assembly 22, as indicated at step 130. Accordingly, the first bearing motor drive assembly 20 will drive the bearing drive hub 34, and thus inner/outer race member 72 (shown in FIG. 4) at a speed that is approximately two mph less than the speed of the input shaft 32, and in the same direction as that of the input shaft 32. The speed signal for the second bearing motor drive assembly 22 operates to drive the inner/outer race member 70a of bearing assembly 62 (FIGS. 3 and 5) at a speed about two mph faster than that of the input shaft 32, and in the same direction as the input shaft 32.

Next the swap interval timer is read to determine if the selected swap time interval has expired, as indicated at step 132. If not, the 50 ms timer is checked to determine if it has timed out, as indicated at 134.

If neither the swap interval timer nor the 50 ms timer has timed out, then the calculated speed signals for the first and second bearing motor drive assemblies 20 and 22, respectively, are still applied to the first and second bearing motor drive assemblies 20 and 22, respectively, and the swap interval timer and the 50 ms timer are read again, as indicated by line 136. However, if the 50 ms timer has timed out then the timer is reset, as indicated at step 138, and the speed signals for the first and second bearing motor drive assemblies 20 and 22 are recalculated, or "up-dated", before being applied to the first and second bearing motor drive assemblies 20 and 22, as indicated by line 140.

If the swap interval timer has timed out, then it is reset, as indicated at step 142. The 50 ms timer is then checked, as indicated at step 144, to determine if it has also timed out. If not, then the calculated speed signal for the second bearing motor drive assembly 22 is applied to the first bearing motor drive assembly 20, as indicated at step 146, while the calculated speed signal for the first bearing motor drive assembly 20 is applied to the second bearing motor drive assembly 22, as indicated by step 148. Accordingly, if the first bearing drive hub 34 was being driven at a speed approximately two mph less than the speed of the input shaft 32, then by steps 146 and 148 the speed signals are swapped and the first bearing drive hub 34 will be driven at speed approximately two mph greater than the speed of the input shaft 32 while the second bearing drive hub 42 will be driven at a speed approximately two mph less than the input shaft 32.

After the speed signals are swapped, the swap interval timer is again checked, as indicated at step 150. If the swap interval timer has not timed out, then the 50 ms timer is again checked to determine if it has timed out, as indicated by line 152 and step 144. If the swap interval timer has timed out, then the timer is reset, as indicated at step 154, and the speed signals are again swapped by applying the speed signal calculated for the first bearing motor drive assembly 20 to that assembly and the calculated speed signal for the second bearing motor drive assembly 22 to that assembly, as indicated by line 156 and steps 128 and 130.

Referring briefly to step 144, if the 50 ms timer has timed out, then the timer is reset, as indicated at step 158, and the speed of the rolls 14 and 16 (i.e., the input shaft 32 speed) is obtained again, as indicated at step 160. The speed signals for the first and second bearing motor drive assemblies 20 and 22 are then recalculated, as indicated at steps 162 and 164, before being applied to the bearing motor drive assemblies 20 and 22, as indicated at steps 146 and 148. Thus, whenever it is determined that the 50 ms timer has timed out, the speed of the input shaft 32, and thus the rolls 14 and 16, is obtained and the speed signals for the first and second motor drive assemblies 20 and 22 are recalculated, as indicated by steps 160-164 and 122-126. It will be appreciated, however, that some applications, particularly where low speed operation is extensive, may require roll speed updating more frequently than every 50 ms.

The driving of the inner/outer race members 72,72a at speeds slightly greater and less than that of the rolls 14,16, and the continuous swapping of the speed signals between the first and second bearing motor drive assemblies 20 and 22 has been found to even more effectively eliminate frictional parasitic losses than if each of the inner/outer race members 72,72a were driven at speeds very close to the exact rotational speed of the rolls 14,16.

Additionally, since bearing friction is somewhat easier to determine and compensate for at roll speeds above about 60 mph– 65 mph, the present invention contemplates controlling the speeds of the inner/outer race members 72,72a to minimize frictional losses up to a roll speed of about 60 mph–65 mph. At roll speeds above 60 mph–65 mph, the speeds of the inner/outer race members 72,72a may be simply maintained, while the frictional losses of the bearings 68,68a due to the difference in roll speed and bearing speed are compensated for by conventional algorithms.

Yet another advantage of the present invention is the ability of the bearing assemblies 60 and 62 to enable the rolls 14,16 to be driven at speeds above the rated maximum speed of the inner bearings 68,68a. For example, assume that each of the inner bearings 68,68a and outer bearings 70,70a are rated to accommodate a maximum roll speed of 100 mph, and the inner/outer race members 72,72a are driven in the same direction of rotation as the input shaft 32 and at a speed equal to that at which the input shaft 32 is driven when the rolls 14,16 are being driven at a speed of about 100 mph. The input shaft 32 and the inner/outer race members 72,72a will then be traveling at approximately the same speed, but there will be virtually no movement of the inner bearing rolls 69,69a relative to either the input shaft 32 or the inner/outer race members 72,72a. For speed considerations, the inner bearings 68,68a are essentially stationary. Thus, the rolls 14,16 may be driven to a rotational speed, in this example, corresponding to about 200 mph, before the inner bearings 68,68a are rotating at a speed corresponding to about 100 mph relative to the inner/outer race members 72,72a. Accordingly, the rolls 14,16 may be driven to a speed roughly double the maximum speed at which the bearings 68,68a,70,70a are rated for, to thereby enable very high speed testing to be performed without the use of expensive, high speed rated bearings.

While the above described technique sacrifices the control over the inner/outer race members 72,72a needed to achieve virtually friction free operation, as mentioned above, friction is somewhat easier to determine at speeds above about 60 mph. Accordingly, traditional friction compensating algorithms can be employed to generally estimate and compensate for frictional losses at such higher speeds.

Those skilled in the art can now appreciated from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A frictionless bearing, chassis dynamometer apparatus comprising:
 roll means for engaging at least one wheel of a vehicle during rotational movement of said wheel;
 inner bearing means associated with said roll means for enabling rotational movement of said roll means relative to a frame portion of said dynamometer;

outer bearing means disposed between said inner bearing means and said frame portion for enabling rotational movement of said inner bearing means relative to said frame portion;

race means disposed between said inner and said outer bearing means forming an outer race for said inner bearing means and an inner race for said outer bearing means, for enabling said inner bearing means to be driven in the same direction of rotation as said roll means; and means for driving said race means in the same direction of rotation as said inner bearing means and at variable speeds in relation to the rotational speed of said roll means, to thereby cancel frictional forces of said inner bearing means opposing rotational movement of said roll means.

2. The apparatus of claim 1, further comprising:

means for sensing the rotational speed of said roll means in real-time and generating a speed signal in accordance therewith.

3. The apparatus of claim 2, wherein said means for driving said race means comprises a drive motor responsive to said speed signal.

4. A frictionless bearing chassis dynamometer apparatus comprising:

roll means for engaging at least one wheel of a vehicle during rotational movement of said wheel;

means for sensing the speed of said roll means and generating a speed signal in accordance with the sensed speed of said roll means;

power exchange means including an input shaft coupled to said roll means for simulating varying loads;

first bearing means coupled to said input shaft or supporting said input shaft and said roll means and enabling rotational movement of said input shaft relative to a frame portion of said dynamometer;

second bearing means disposed between said first bearing means and said frame portion of said dynamometer for supporting said first bearing means;

inner/outer race means disposed in between said first and second bearing means and responsive to said speed signals for driving said first bearing means in the same direction as said input shaft and at a speed close to the speed of said input shaft to thereby cancel friction forces of said first bearing means which oppose rotational movement of said roll means.

5. The apparatus of claim 4, further comprising motor means responsive to said speed signal for rotationally driving said inner/outer race means.

6. The apparatus of claim 5, wherein said motor means drives said inner/outer race means at speeds that are alternately slower and faster than the rotational speed of said input shaft.

7. A frictionless bearing, chassis dynamometer apparatus comprising:

first and second roller means aligned along a common longitudinal axis for engaging a pair of wheels of a vehicle during rotational movement of said pair of wheels;

encoder means for sensing the speed of sad first and second roll means and generating a speed signal in accordance with the speed of said first and second roll means;

power exchange means disposed centrally in between said first and second roll means and including an input shaft coupled to and aligned with the axis of rotation of each of said first and second roll means for simulating variable loads to be driven by said pair of wheels of said vehicle;

a pair of inner annular bearings each disposed on said input shaft at opposite ends of said input shaft;

a pair of outer annular bearings, each one of said outer annular bearings being disposed coaxially in between an associated one of said inner annular bearings and an associated frame portion of said apparatus;

a pair of inner/outer race members, each said inner/outer race member being disposed in between a respective one of said inner and outer annular bearings and each acting as an outer race for its respective inner annular bearing and an inner race for its respective outer annular bearing; and motor drive means responsive to said speed signal and coupled to said inner/outer race members for driving said inner/outer race members in the same direction of rotation as said first and second roll means and at variable speeds in accordance with the rotational speed of said first and second roll means, to thereby cancel frictional forces generated by said inner annular bearings which oppose rotational movement of said first and second roll means.

8. The apparatus of claim 7, wherein said motor means drives said inner/outer race members at speeds alternately faster and slower than the rotational speed of said inner annular bearing.

9. The apparatus of claim 8, wherein said motor drive means comprises first and second drive motors each coupled independently to one of said pair of inner/outer race members for driving each of said inner/outer race members independently of each other in the same direction of rotation as said first and second roll means.

10. The apparatus of claim 9, wherein said first and second drive motors alternately drive said inner/outer race members at rotational speeds faster and slower than the rotational speeds of their respective inner annular bearings such that when one of said inner/outer race members is being driven at a slower speed than its respective inner annular bearing, the other inner/outer race member ring is being driven at a rotational speed greater than the speed of its associated inner annular bearing, and when said one inner/outer race member is being driven at a rotational speed slower than the rotational speed of its respective inner annular bearing, said other inner/outer race member is driven at a speed greater than the rotational speed of its associated inner annular bearing.

11. The apparatus of claim 9, further comprising an external controller;

wherein said speed signal is generated in the form of a serial data stream; and wherein each of said first and second drive motors are independently, electrically coupled to said controller by an RS-232 serial interface.

12. The apparatus of claim 9, wherein said first and second drive motors are each coupled to their respective inner/outer race members via a pulley and a pulley belt.

13. The apparatus of claim 7, wherein said encoder means comprises an electro-optical encoder having an encoder shaft fixedly secured to at least one of said first and second roll means.

14. A frictionless bearing, chassis dynamometer apparatus comprising:

a first roll for engaging one wheel of a vehicle during rotational movement of said wheel and adapted to rotate about a central longitudinal axis;

a second roll spaced laterally apart from said first roll for engaging a second wheel of said vehicle during rotational movement of said second wheel and adapted to rotate about a central longitudinal axis, said central longitudinal axes of rotation of said first and second rolls further being longitudinally aligned such that said first and second rolls have a common longitudinal axis of rotation;

a power exchange unit disposed in between said first and second rolls and having an input drive shaft having first and second ends in longitudinal alignment with the axes of rotation of said first and second rolls, said power exchange unit being operable to simulate variable loads;

an electro-optical encoder for sensing the rotational speed of said first and second rolls and generating a variable electrical speed signal in accordance with the changing rotational speed of said first and second rolls;

a first inner annular roller bearing circumscribing said first end of said input shaft and being in contact with said input shaft;

a first annular outer roller bearing disposed concentrically over said first inner annular roller bearing and being supported by a first frame portion of said apparatus;

said second end of said input shaft having a second inner annular roller bearing disposed concentrically thereover;

a second outer annular roller bearing disposed concentrically over said second end of said input shaft in lateral alignment with said second inner annular roller bearing, said second outer annular bearing of said second end of said input shaft being supported by a second frame portion of said apparatus;

a first inner/outer race member disposed concentrically between said first inner and first outer roller bearings at said first end of said input shaft forming an outer race for said first inner roller bearing and an inner race for said first outer roller bearing;

a second inner/outer race member disposed concentrically between said second inner and second outer annular roller bearings at said second end of said input shaft;

a first drive motor responsive to said variable electrical speed signal generated by said encoder means and coupled to said first inner/outer race member for driving said first inner/outer race member at a variable rotational speed alternately faster and slower than the rotational speed of said input shaft.

a second drive motor responsive to said variable electrical speed signal generated by said encoder means and coupled to said second inner/outer race member for driving said second inner/outer race member at a variable rotational speed alternately faster and slower than the rotational speed of said input shaft.

15. A method for cancelling frictional forces in a chassis dynamometer which oppose rotational movement of a pair of rolls of the dynamometer as the rolls are driven by a pair of wheels of a vehicle under test, said method comprising:

providing a power exchange device having an input shaft fixedly coupled to at least one of the rolls;

providing an inner annular roller bearing coaxially disposed over said input shaft;

providing an outer annular roller bearing coaxially disposed and laterally aligned with said inner annular roller bearing on said input shaft, said outer annular roller bearing being supported by a frame portion of the dynamometer;

providing an inner/outer race member interposed between said inner and outer annular roller bearings and forming an outer race of said inner annular bearing and an inner race of said outer annular bearing; and driving said inner/outer race member at a variable rotational speed in relation to the rotational speed of said input shaft.

16. The method of claim 15, further comprising the step of driving the inner/outer race member alternately at rotational speeds that are lesser and greater than the rotational speed of said input shaft and switching between said faster and slower rotational speeds in accordance with a predetermined time interval.

* * * * *